Patented Dec. 8, 1953

2,662,023

UNITED STATES PATENT OFFICE 2,662,023

COTTONSEED MEAL GLUE

Jett C. Arthur, Jr., Metairie, and Joseph T. Hogan, New Orleans, La., assignors to the United States of America as represented by the Secretary of Agriculture No Drawing. Application May 18, 1951, Serial No. 227,097

1 Claim. (Cl. 106—78)

(Granted under Title 35, U. S. Code (1952), sec. 266)

This invention may be manufactured and used by or for the Government of the United States of America for governmental purposes throughout the world without the payment to us of any royalty thereon.

This invention relates to the production of glue from cottonseed meal or cake, which glues are suitable for the many applications for which seedmeal glues have been found satisfactory, and which have the unique advantage of a desirably low viscosity, a high tack, good spreadability, and a long working life.

An important and typical application of seedmeal glues is in the manufacture of plywood. The glues used are often derived entirely or in part from seedmeals and are formed in general by suspending the pulverized cottonseed meal in a basic aqueous medium containing additives for various purposes.

According to the present invention active anions of the Hoffmeister or lyotropic series in amounts (1 to 2% based on the weight of the meal) which reduce the viscosity to the desired value without reducing the tack are incorporated with the glue. This not only improves the spreadability and working life of cottonseed meal glues without reducing the strength of the glue joints, but also results in an increase in the tackiness of the glue. The combined effects result in cottonseed meal glues having a viscosity best suited for spreading by the conventional mechanical equipment, having a high degree of tackiness, and having a long working life.

The more active and preferred anions of the Hoffmeister series include the trichloracetate, borate, citrate, nitrate, acetate, and tartrate anions, the trichloracetate anion being particularly preferred.

The cottonseed meal used may be that from which the oil was removed by screw-pressing, hydraulic-pressing or by solvent extraction in the conventional manner.

Solvent extracted meals are preferred. Meals which have been de-oiled in any manner which leaves a meal containing at least 70% soluble nitrogen, as determined by suspending 2.5 grams of the meal in 100 mls. of 0.5 M NaCl for 3 hours at 25° C., are satisfactory.

The addition of trichloracetic acid to the basic suspension is the preferred method of incorporating the trichloracetate anion. Particularly suitable results are obtained by the addition of from 1 to 2% of trichloracetic acid based on the weight of cottonseed meal.

Particularly preferred glues provided by the process of the invention consist of those made from a cottonseed meal containing at least 70% soluble nitrogen, and containing, based upon the weight of meal, from 10 to 20% silicate, from 10 to 20% calcium hydroxide and from 1 to 2% trichloracetate in an aqueous sodium hydroxide dispersion having a pH of from 11.5 to 12.5.

The glues provided by this invention can be made by preparing a basic cottonseed meal glue in the conventional manner and adding to the basic glue the appropriate amount of one or more lyotropic anions. For example, such glues can be prepared by the following procedure. An oil-free cottonseed meal is pulverized to a flour-like consistency and from 20 to 40 parts of the meal is suspended in 100 parts of water. When the suspended meal is thoroughly wet, it is converted to a basic cottonseed meal glue by the addition of chemicals conventionally employed. For example, the addition of (based upon 100 parts of meal) 4 parts of sodium hydroxide, 15 parts of sodium silicate, 15 parts of calcium hydroxide and 4 parts of sodium hydroxide dissolved in 335 parts of water and 3 parts of carbon disulphide-carbon tetrachloride water repellent "dope" to the suspension of wet meal; produces a basic glue having a pH of about 12.

The basic glue is converted to the improved glue of this invention by adding, for example, trichloroacetate anions, preferably in the form of trichloroacetic acid or a sodium or potassium salt thereof, until the viscosity of the basic glue is reduced and its tack is improved. The presence of larger and larger amounts of the lyotropic series anions results in lower and lower viscosities, but the initial tackiness of the basic glue (inherently poor in cottonseed meal glues) is for a time improved and then returns to a low value. Therefore, in accordance with the invention, only the amount of a lyotropic series anion which reduces the viscosity and improves the tack of the basic glue is added.

The following examples exhibit the invention in detail.

EXAMPLE I

*Preparation of a cottonseed meal glue*

A hexane-extracted oil-free cottonseed meal was pulverized. An aqueous suspension was prepared from 100 parts of the meal which had been passed through a 200 mesh screen and 335 parts of water. When the meal was thoroughly wetted, 8 parts of water containing 4 parts of sodium hydroxide and 1.75 parts of trichloracetic acid were added.

The resulting glue had a viscosity of 238 poises after 1 hour, 215 poises after 2 hours, and 198 poises after 3 hours. The tackiness of the glue was very good for the whole period, and the strength of glue joints prepared from this glue compared favorably with the strength of glue joints obtainable from peanut meal glues or casein glues.

EXAMPLE II

*The effect of lyotropic series anions upon viscosity and tack*

A series of hexane extracted cottonseed meal basic glues were prepared containing 100 parts of meal (which had been passed through a 200 mesh screen), 400 parts of water, 5.5 parts of sodium hydroxide, and the indicated amounts of trichloroacetic acid.

| Trichloro-acetic acid, percent | Viscosity and tack | | |
|---|---|---|---|
| | 1 hour | 2 hours | 3 hours |
| 0.00 | 495-550 poises, poor tack. | | 629 poises, poor tack. |
| 0.55 | 271 poises, poor tack. | 242 poises, poor tack. | 216 poises, poor tack. |
| 1.10 | 269 poises, good tack. | 249 poises, good tack. | 230 poises, good tack. |
| 1.75 | 238 poises, very good tack. | 215 poises, very good tack. | 198 poises, very good tack. |
| 2.20 | 210 poises, poor tack. | 187 poises, poor tack. | 163 poises, poor tack. |

Having thus described our invention, we claim:

A cottonseed meal glue having good tack and a viscosity which remains in the order of 200 poises for at least 3 hours, which glue consists essentially of a dispersion in an aqueous sodium hydroxide solution having a pH from 11.5 to 12.5 of cottonseed meal containing at least 70% soluble nitrogen; from 10 to 20%, based on the weight of meal, of a silicate; from 10 to 20%, based on the weight of the meal, of calcium hydroxide; and from 1 to 2%, based on the weight of meal, of a substance yielding trichloroacetate ions in solution.

JETT C. ARTHUR, Jr.
JOSEPH T. HOGAN.

References Cited in the file of this patent

UNITED STATES PATENTS

| Number | Name | Date |
|---|---|---|
| 2,531,383 | Arthur, Jr. | Nov. 28, 1950 |
| 2,559,848 | Caldwell | July 10, 1951 |

FOREIGN PATENTS

| Number | Country | Date |
|---|---|---|
| 140,911 | Great Britain | Apr. 8, 1920 |
| 116,694 | Australia | Mar. 25, 1943 |

OTHER REFERENCES

Viscosity Patterns of Peanut Protein Solutions, Burnett, Roberts & Parker, Industrial & Engineering Chemistry, March 1945, vol. 37, No. 3, page 280.

Peptization of Peanut & Cottonseed Proteins, Fontaine et al., Industrial & Engineering Chemistry, vol. 38, No. 6, June 1946, page 661.